(12) United States Patent
Takaya

(10) Patent No.: US 9,963,064 B2
(45) Date of Patent: May 8, 2018

(54) HEADLIGHT DEVICE FOR MOTORCYCLE

(71) Applicant: Kawasaki Jukogyo Kabushiki Kaisha, Hyogo (JP)

(72) Inventor: Satoshi Takaya, Kobe (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 59 days.

(21) Appl. No.: 14/731,265

(22) Filed: Jun. 4, 2015

(65) Prior Publication Data

US 2015/0266410 A1    Sep. 24, 2015

Related U.S. Application Data

(63) Continuation of application No. PCT/JP2013/078838, filed on Oct. 24, 2013.

(30) Foreign Application Priority Data

Dec. 14, 2012  (JP) .................................. 2012-273252

(51) Int. Cl.

| | | |
|---|---|---|
| *B62J 6/02* | (2006.01) | |
| *B60Q 1/04* | (2006.01) | |
| *B62J 6/18* | (2006.01) | |
| *B60Q 1/00* | (2006.01) | |
| *F21V 23/00* | (2015.01) | |

(52) U.S. Cl.
CPC ......... *B60Q 1/0483* (2013.01); *B60Q 1/0094* (2013.01); *B62J 6/02* (2013.01); *B62J 6/18* (2013.01); *F21V 23/008* (2013.01)

(58) Field of Classification Search
CPC .. B60Q 1/0047; B60Q 1/0483; B60Q 1/2696; B62J 6/02; B62J 6/18; F21S 48/1104; F21S 48/1109; F21S 48/1113; F21S 48/1118; F21S 48/1122; F21S 48/211; F21S 48/212
See application file for complete search history.

(56) References Cited

U.S. PATENT DOCUMENTS

| | | | | |
|---|---|---|---|---|
| 6,135,625 A | * | 10/2000 | Kodaira | ..................... B62J 6/02 362/473 |
| 6,439,753 B1 | * | 8/2002 | Sumada | ............... B60Q 1/0041 362/475 |
| 7,287,889 B2 | | 10/2007 | Yamamoto | |

(Continued)

FOREIGN PATENT DOCUMENTS

| | | |
|---|---|---|
| CN | 1903638 | 1/2007 |
| CN | 202368720 | 8/2012 |

(Continued)

OTHER PUBLICATIONS

English Machine Translation of JP 2009161011 and JP 2010116127 from ESPACENET.*

(Continued)

*Primary Examiner* — Jong-Suk (James) Lee
*Assistant Examiner* — Zheng Song

(57) ABSTRACT

A headlight device (40) for a motorcycle is accommodated in a front fairing (30). The headlight device (40) includes lamp units (42) using LEDs as light sources (46*a*, 48*a*), and a power supply circuit unit (44) which controls power from a power supply and supplies the power to the light sources (46*a*, 48*a*). The power supply circuit unit (44) is accommodated in a recess (56) provided in an upper portion of the lamp units (42).

7 Claims, 10 Drawing Sheets

(56) References Cited

U.S. PATENT DOCUMENTS

| | | | |
|---|---|---|---|
| 2004/0223335 | A1 | 11/2004 | Yamamoto |
| 2010/0232170 | A1* | 9/2010 | Tu ............................. B62J 6/02 362/475 |
| 2011/0155495 | A1* | 6/2011 | Matsuda ................ B62K 11/04 180/219 |
| 2011/0273896 | A1 | 11/2011 | Yun |
| 2013/0044504 | A1* | 2/2013 | Ushio .................. B60Q 1/0094 362/520 |
| 2014/0003078 | A1* | 1/2014 | Monma ...................... B62J 6/02 362/516 |
| 2014/0063826 | A1* | 3/2014 | Noguchi .................... B62J 6/02 362/476 |

FOREIGN PATENT DOCUMENTS

| | | | | |
|---|---|---|---|---|
| DE | 202012004965 | | 8/2012 | |
| JP | 09-29403 | | 11/1997 | |
| JP | 09-293403 | | 11/1997 | |
| JP | 11-238405 | | 8/1999 | |
| JP | 2003205878 | * | 7/2003 | ............... B62J 9/00 |
| JP | 2004-268690 | | 9/2004 | |
| JP | 2009161011 | * | 7/2009 | ............... B26J 6/18 |
| JP | 2009202670 | * | 9/2009 | ............... B62J 6/02 |
| JP | 2010-116127 | | 5/2010 | |
| JP | 2011-173504 | | 9/2011 | |
| JP | 2011-235881 | | 11/2011 | |
| WO | 2012/120947 | | 9/2012 | |

OTHER PUBLICATIONS

English Machine Translations of JP 2009202670 and JP 2003205878 provided by ESPACENET.*
PCT Application No. PCT/JP2013/078838 International Preliminary Report on Patentability dated Jun. 16, 2015, 8 pages.
PCT/JP2013/078838 International Search Report dated Jan. 21, 2014, 2 pages.
Extended and Supplementary Search Report dated Aug. 17, 2016 for Corresponding European Patent Application No. 13863502.4 (7 pages).
Notification of Reason(s) for Rejection dated Apr. 5, 2016 for corresponding Japan Patent Application No. 2012-273252 with English language summary, 5 pages.
First Office Action dated Oct. 21, 2016 for Corresponding Chinese Patent Application No. 201380065993.4 with English Language translation of the Search Report attached to the Office Action (7 pages).
Second Office Action dated Jun. 2, 2017 for Corresponding Chinese Patent Application No. 201380065993.4 with English Language Summary (5 pages).

* cited by examiner

HEADLIGHT DEVICE FOR MOTORCYCLE

CROSS REFERENCE TO THE RELATED APPLICATION

This application is a continuation application, under 35 U.S.C § 111(a) of international application No. PCT/JP2013/078838, filed Oct. 24, 2013, which claims priority to Japanese patent application No. 2012-273252, filed Dec. 14, 2012, the entire disclosure of which is herein incorporated by reference as a part of this application.

BACKGROUND OF THE INVENTION

Field of the Invention

The present invention relates to headlight devices for motorcycles, using LEDs (light emitting diodes) as light sources. In particular, the present invention relates to a headlight device mounted to a front fairing of a motorcycle.

Description of Related Art

In recent years, LEDs have been increasingly adopted as light sources of headlight devices for motorcycles (for example, Patent Document 1). Since a headlight device using LEDs is smaller in size as compared to a conventional headlight device using bulbs, downsizing of a front fairing can be expected when the headlight device is covered with the front fairing.

RELATED DOCUMENT

Patent Document

[Patent Document 1] JP Patent No. 4376528

The headlight device using LEDs requires a power supply circuit unit which controls power from a power supply and supplies the power to the LEDs, and the power supply circuit unit also needs to be accommodated in the front fairing. Since the shape of the front fairing is determined in view of its function and appearance, it is difficult to secure an arrangement space for the power supply circuit unit if the front fairing is downsized.

SUMMARY OF THE INVENTION

In view of the aforementioned problem, an object of the present invention is to provide a headlight device for a motorcycle, in which LEDs and a power supply circuit unit can be accommodated in a front fairing in a compact manner while downsizing the front fairing.

In order to achieve the aforementioned object, a headlight device for a motorcycle according to the present invention is accommodated in a front fairing of the motorcycle, and includes a lamp unit using an LED as a light source, and a power supply circuit unit configured to control power from a power supply and then supply the power to the light source. The power supply circuit unit is accommodated in a recess provided in an upper portion of the lamp unit.

With this configuration, since the LED light source is used, the lamp unit can be downsized. When the downsized lamp unit is located at the lowermost position in the front fairing, the lamp unit can be easily accommodated in the front fairing even when the front fairing is downsized. The front fairing generally has a tapered shape having an upper portion of a small length in the front-rear direction or the longitudinal direction, and a lower portion of a large length in the longitudinal direction. Therefore, it is preferable for the downsized front fairing that the lamp unit is located at the lower position in the front fairing where a sufficient space is secured. At this time, since the power supply circuit unit is accommodated in the recess provided above the lamp unit, the lamp unit can be located at the lower position in the front fairing without being obstructed by the power supply circuit unit. Thus, the lamp unit and the power supply circuit unit can be accommodated in the front fairing in a compact manner while downsizing the front fairing.

In the present invention, it is preferable that an elastic body is interposed between the power supply circuit unit and the recess. With this configuration, positional deviations between the power supply circuit unit and the lamp unit in the longitudinal direction and the left-right direction or the motorcycle widthwise direction are absorbed by the elastic body.

When the elastic body is provided, it is preferable that the recess is provided in the upper portion of the lamp unit, and the power supply circuit unit is accommodated in a box formed of the elastic body and opened upward, and the box is pressed against an inner surface of the recess. With this configuration, since the power supply circuit unit is incorporated in the lamp unit by only accommodating the box in the recess, the assembly is facilitated. Further, since the box is pressed against the inner surface of the recess, the relative position of the box to the lamp unit is made stable. Thereby, for example, the box and a lamp bracket can be connected not by fastening but by a simple insertion-type locking structure. Further, since the box is formed of an elastic body, vibration transmitted from the lamp bracket during traveling of the motorcycle is also absorbed.

In the present invention, it is preferable that the power supply circuit unit and the lamp unit are supported by a lamp bracket, and the lamp bracket is mounted to a top bridge which supports a front fork. In this case, it is preferable that the lamp bracket is mounted to the top bridge through a mounting bracket. With this configuration, since the lamp bracket supports both the lamp unit and the power supply circuit unit, the number of components and the number of assembling steps are reduced. Further, an assembly is configured by connecting the lamp bracket and the mounting bracket to the headlight device and the front fairing, and the assembly is mounted to the top bridge, whereby the headlight device and the front fairing are assembled to the vehicle body. Therefore, assemblability of the headlight device and the front fairing is improved.

When the mounting bracket is provided, it is preferable that the mounting bracket is provided with a first holding member which allows cables to pass therethrough and holds the cables. In this case, it is further preferable that the lamp bracket is provided with a second holding member which holds the cables in cooperation with the first holding member. With this configuration, since the mounting bracket and the lamp bracket are provided with the first and second holding members, respectively, the mounting bracket and the lamp bracket can also be used for holding the cables. Further, when the above-described assembly is configured, the cables are held by the first and second holding members, whereby assemblability is improved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, preferred embodiments of the present invention will be described with reference to the drawings. In the description herein, "left side" and "right side" refer to the left side and right side, respectively, as viewed by a rider riding a vehicle.

Figure 1:
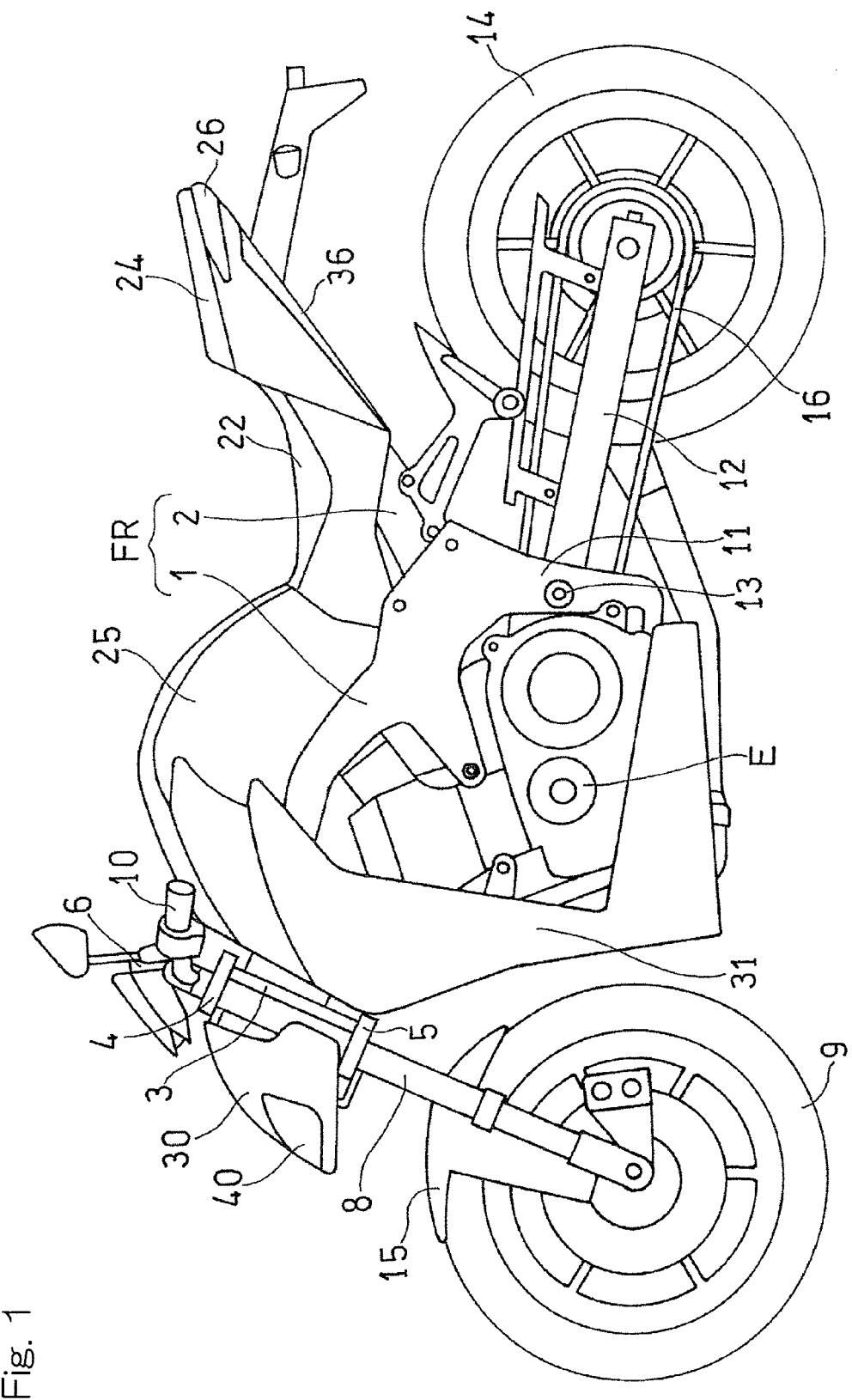
FIG. 1 is a side view showing a motorcycle equipped with a headlight device according to a first preferred embodiment of the present invention.

FIG. 1 shows a motorcycle to which the present invention is applied. A motorcycle body frame structure FR of the motorcycle includes a main frame 1, forming a front half thereof, and a rear frame 2 forming a rear half thereof. The rear frame 2 is connected to a rear portion of the main frame 1. A head pipe 3 is mounted to a front end of the main frame 1, and a steering shaft (not shown) is rotatably inserted into the head pipe 3. A top bridge 4 and a bottom bridge 5 are mounted to the steering shaft, and a front fork 8 is supported by the top bridge 4 and the bottom bridge 5. A front wheel 9 is supported by a lower end portion of the front fork 8, and a front fender 15 is mounted above the front wheel 9. A handlebar 10 is mounted to the top bridge 4 provided at an upper end of the front fork 8.

A swingarm bracket 11 is provided at a rear end portion of the main frame 1. A swingarm 12 is supported by the swingarm bracket 11 so as to be swingable in the up-down direction, through a pivot pin 13 inserted into a front end portion of the swingarm 12. A rear wheel 14 is supported by a rear end portion of the swingarm 12. An engine E is supported at a position below an intermediate portion of the main frame 1. The engine E drives the rear wheel 14 through a power transmission mechanism 16 such as a chain.

A rider's seat 22 and a fellow passenger's seat 24 are supported by the rear frame 2, and a tail lamp 26 is supported at a rear end of the rear frame 2. Below the tail lamp 26, a rear fender 36 is mounted so as to be located above the rear wheel 14.

A fuel tank 25 is mounted in an upper portion of the main frame 1, that is, in an upper portion of the vehicle body between the handlebar 10 and the rider's seat 22. A headlight device 40 is supported by the top bridge 4 and the bottom bridge 5. A front fairing 30 made from a resin is supported by the headlight device 40 so that the front fairing 30 covers the headlight device 40 from top, bottom, and both sides. A side fairing 31 made from a resin is mounted rearward of the front fairing 30. The side fairing 31 covers, from the lateral sides, a portion ranging from a lower end portion of the fuel tank 25 to front and lower-end portions of the engine E.

Figure 2:
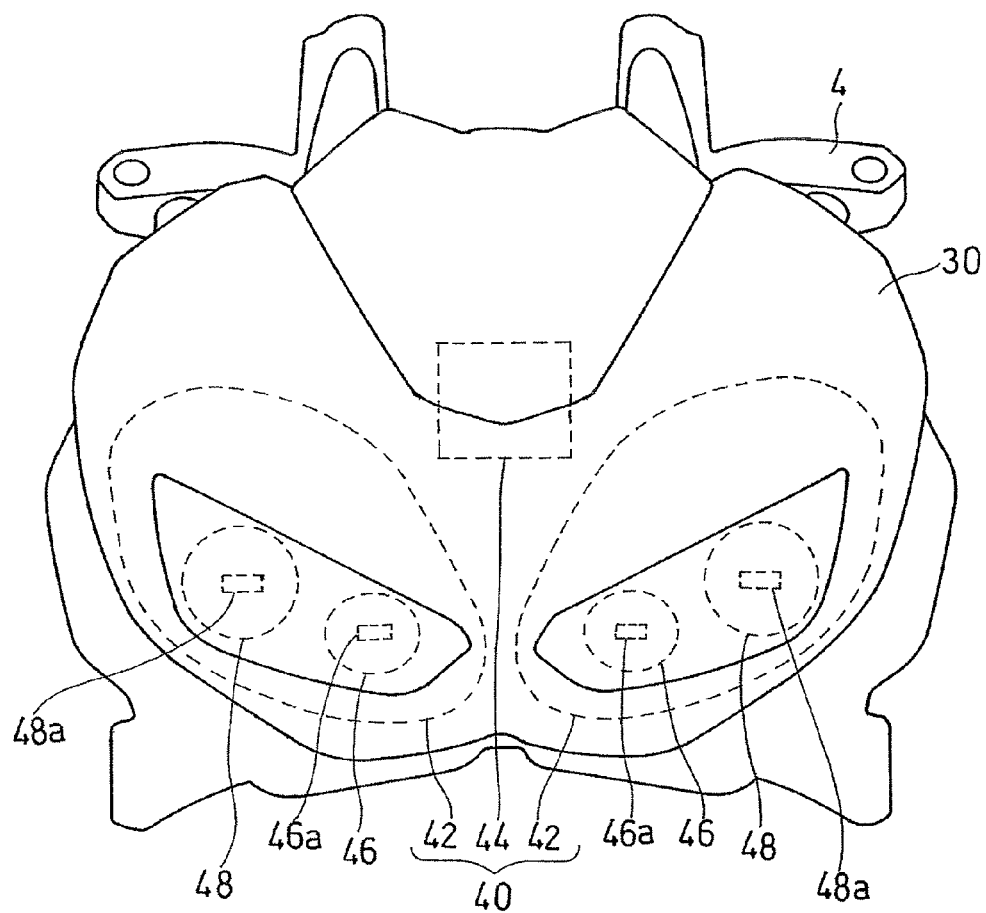
FIG. 2 is a front view showing a main part of the motorcycle.

As shown in FIG. 2, the headlight device 40 includes lamp units 42 and a power supply circuit unit 44. The lamp units 42 are disposed at an area below the front fairing 30. The power supply circuit unit 44 is disposed above the lamp units 42, at a center portion, in the left-right direction or the motorcycle widthwise direction, between the lamp units 42.

The lamp units 42 include a pair of left and right low-beam lamps 46 disposed inward in the motorcycle widthwise direction, and a pair of left and right high-beam lamps 48 disposed outward in the motorcycle widthwise direction. Light sources 46a and 48a of the lamps 46 and 48 are composed of LEDs. The power supply circuit unit 44 controls DC power from a power supply (non-illustrated battery) and supplies the power to the LEDs as the light sources 46a and 48a.

Figure 3:
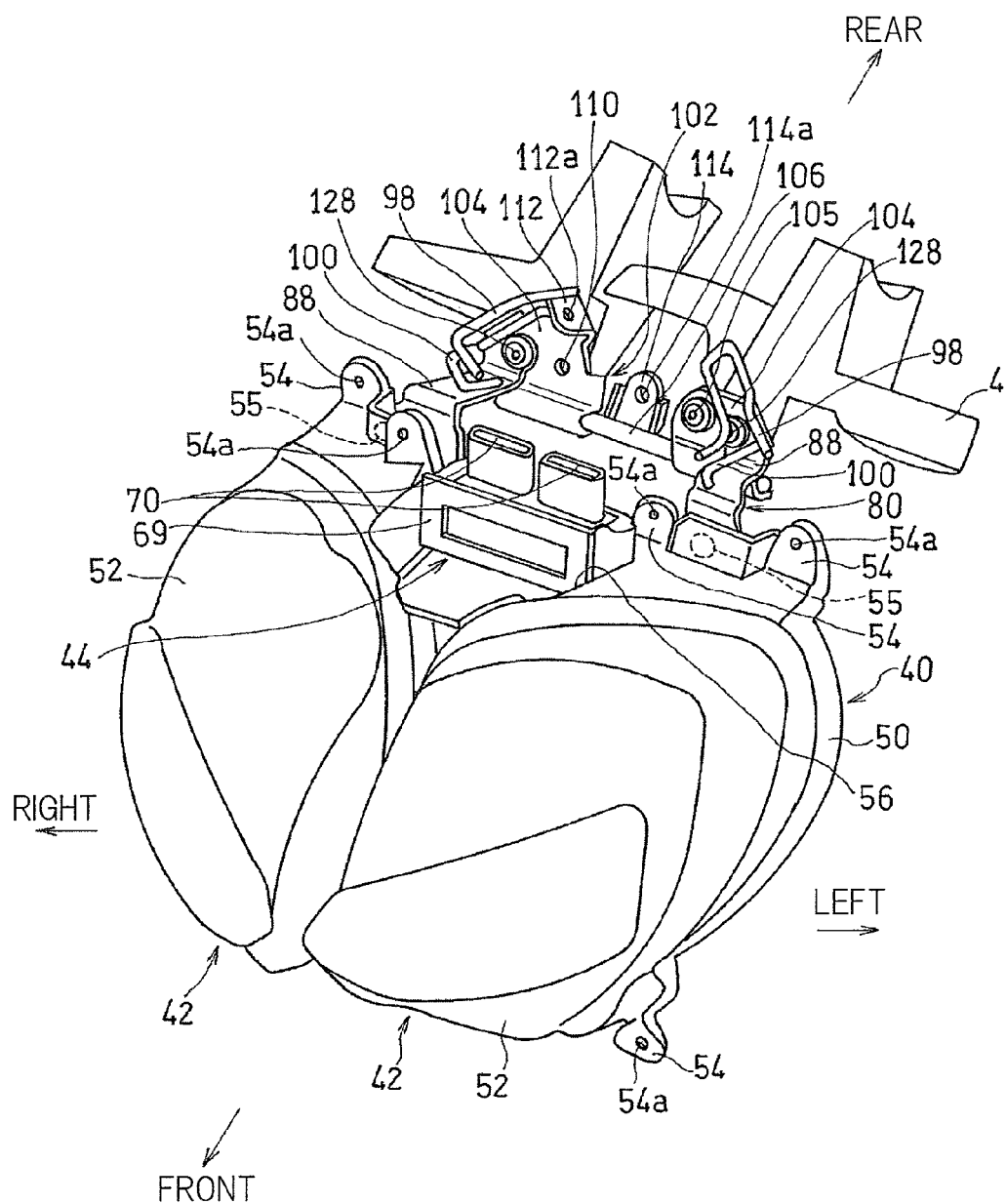
FIG. 3 is a perspective view showing the headlight device.
Figure 4:
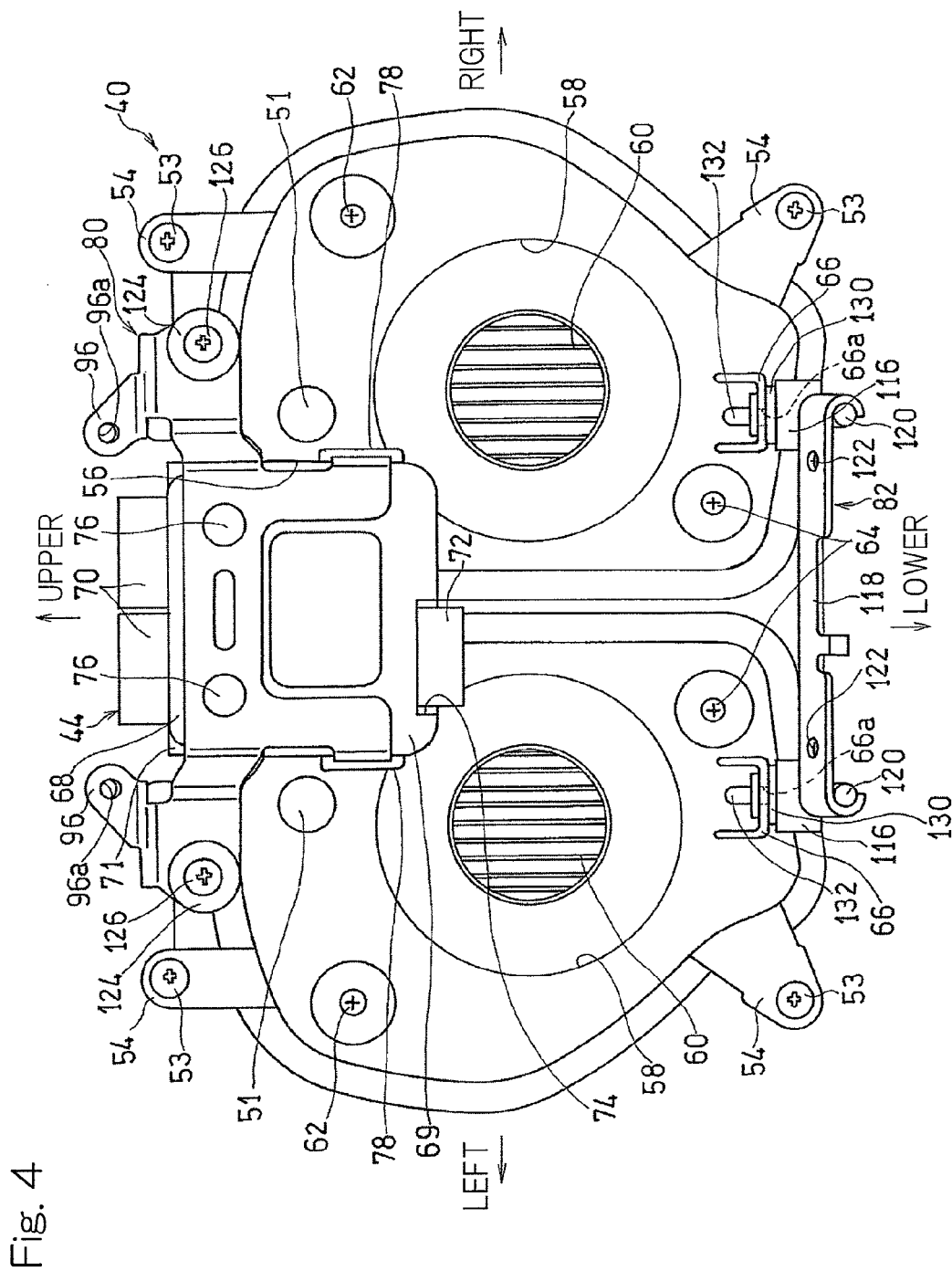
FIG. 4 is a rear view showing the headlight device.

FIG. 3 is a perspective view of the headlight device 40, as seen obliquely from the front and left side. FIG. 4 is a rear view of the headlight device 40. As shown in FIG. 3, in each of the lamp units 42 of the headlight device 40, a frame (not shown) supporting the lamps 46 and 48 (FIG. 2) is connected to a common lamp base 50 by means of a bolt 51 and later-described adjustment screws 62 and 64 (FIG. 4). The lamp base 50 is made from a resin, for example. A lens cover 52 is disposed in front of each lamp unit 42. The lens cover 52 is engaged with the lamp base 50 by means of claws and thereafter fixed to the lamp base 50 by means of an adhesive.

At an upper portion and a lower portion of the lamp base 50, fairing attachment pieces 54 each having an insertion hole 54a are integrally formed. Four fairing attachment pieces 54 are provided at the upper portion of the lamp base 50, and two fairing attachment pieces 54 are provided at the lower portion of the lamp base 50. FIG. 4 shows only two fairing attachment pieces 54 at the upper portion. A bolt 53 is inserted into each insertion hole 54a from the rear, and fastened to a screw hole (not shown) formed in the front fairing 30 shown in FIG. 2. Thus, the front fairing 30 is mounted to the headlight device 40.

At a center portion, in the motorcycle widthwise direction, of the upper portion of the lamp base 50 shown in FIG. 3, a recess 56 recessed downward is provided. The power supply circuit unit 44 is accommodated in the recess 56. Specifically, the recess 56 is provided on a rear side of the upper portion of the lamp base 50. Regarding the four fairing attachment pieces 54 provided at the upper portion of the lamp base 50, two of them are disposed on each of the left and right sides across the recess 56 (FIG. 4). A screw boss 55 projecting rearward is formed between the two fairing attachment pieces 54 formed at the left side.

As shown in FIG. 4, openings 58, 58 are formed at positions corresponding to the left-side lamps 46 and 48 and the right-side lamps 46 and 48 on the rear surface of the lamp base 50. The openings 58, 58 are arranged so that heat sinks 60, 60 are exposed therein. The heat sinks 60 are attached to the LEDs to lower the temperature of the LEDs by heat dissipation.

At left and right ends of an upper portion of the rear surface of the lamp base 50, motorcycle widthwise direction adjustment screws 62, 62 for adjusting the optical axes, in the motorcycle widthwise direction, of the left and right lamp units 42, 42 are provided, respectively. At the center, in the motorcycle widthwise direction, of a lower portion of the rear surface of the lamp base 50, up-down direction adjustment screws 64, 64 for adjusting the optical axes, in the up-down direction, of the left and right lamp units 42, 42 are provided.

At the lower portion of the rear surface of the lamp base 50, specifically, at positions outward of the up-down direction adjustment screws 64, 64 in the lower portion, lower bracket attachment pieces 66, 66 are formed, respectively. In each lower bracket attachment piece 66, a lower bracket attachment hole 66a extending in the up-down direction is formed.

Figure 6:
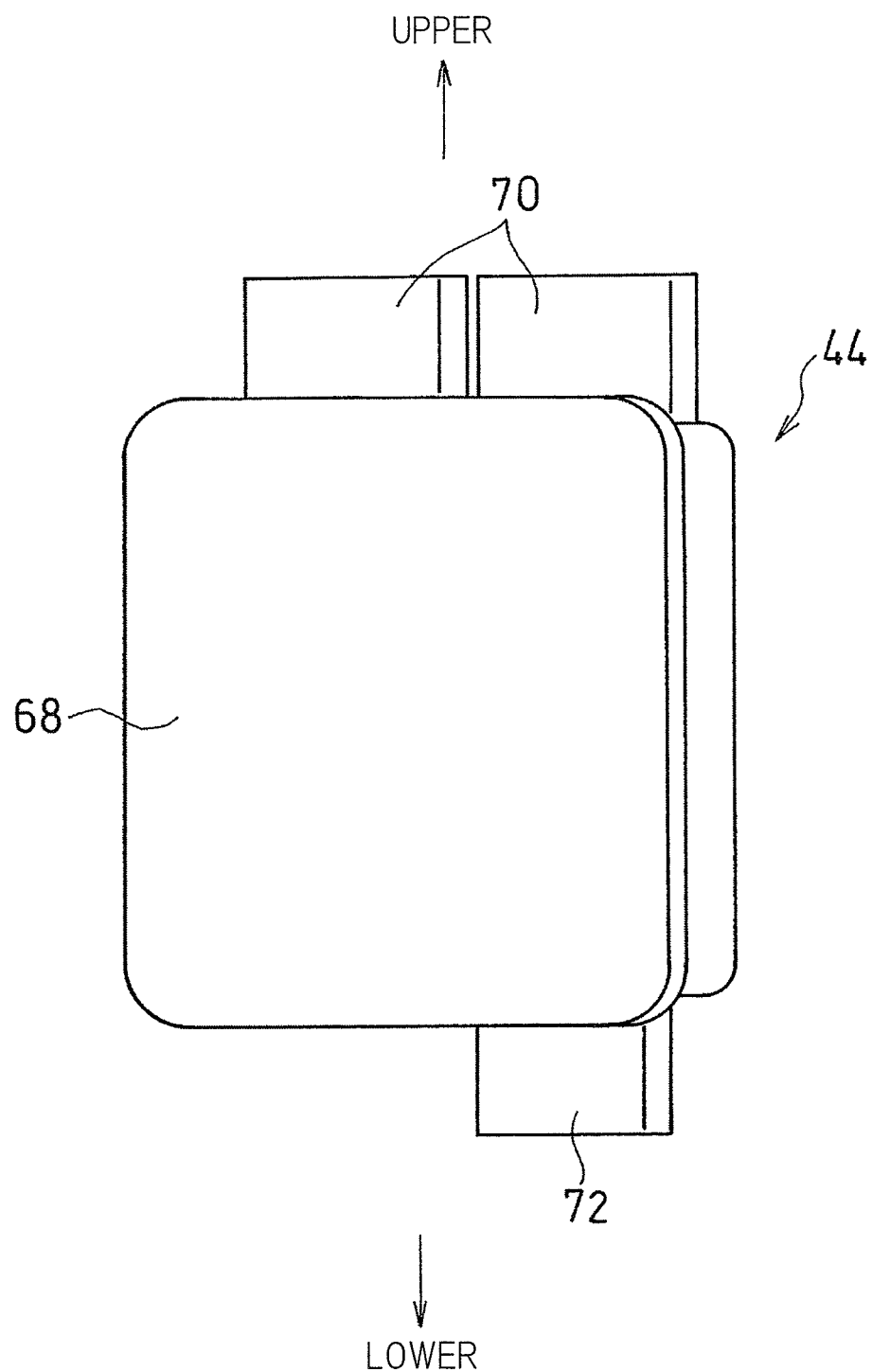
FIG. 6 is a perspective view showing the power supply circuit unit.

As shown in FIG. 6, the power supply circuit unit 44 has a unit body 68 which is rectangle as seen from the front. Two output side connectors 70 facing upward are provided at an upper portion of the unit body 68, and one input side connector 72 facing downward is provided at a lower portion thereof. The input side connector 72 is connected to a cable which connects the power supply circuit unit 44 to the power supply on the vehicle body side. The output side connectors 70 are connected to a cable which connects the power supply circuit unit 44 to the lamp units 42.

The unit body 68 of the power supply circuit unit 44 shown in FIG. 4 is accommodated in a box 69 opened upward. The box 69 is made from an elastic material such as rubber. That is, an elastic body is interposed between the power supply circuit unit 44 and the recess 56 of the headlight device 40.

Figure 7:
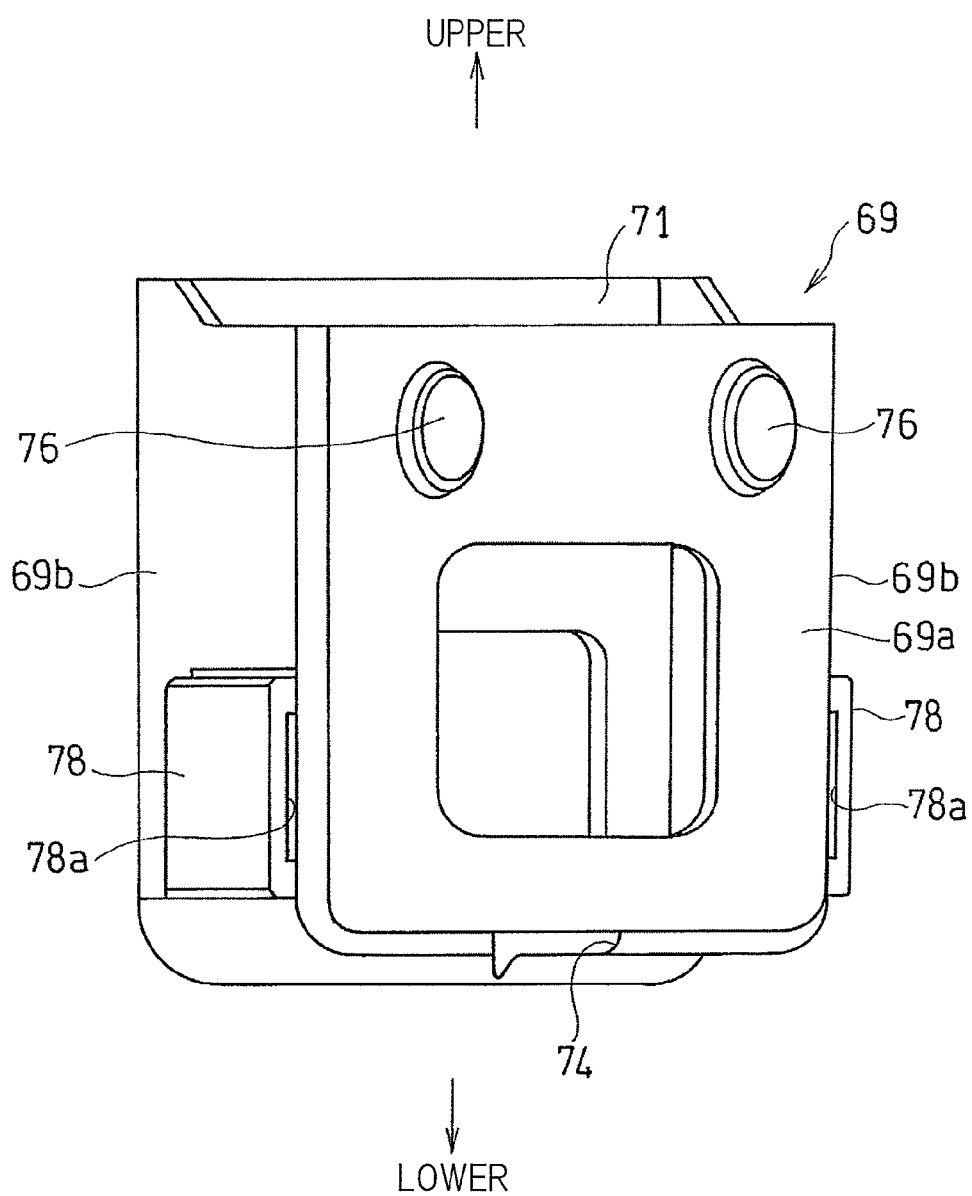
FIG. 7 is a perspective view showing the box.

As shown in FIG. 7, the box 69 has a substantially rectangular parallelepiped shape having a box opening 71 at an upper portion thereof. A connector opening 74 is formed at a lower portion of the box 69. As shown in FIG. 4, in the state where the unit body 68 is accommodated in the box 69, the output side connectors 70 project upward from the box opening 71, and the input side connector 72 projects downward from the connector opening 74.

The box 69 shown in FIG. 7 has, at an upper portion of a rear surface 69a thereof, two engagement projections 76, 76 formed side by side in the motorcycle widthwise direction. Further, at lower portions of both side surfaces 69b, 69b of the box 69, bracket engagement parts 78, 78 projecting laterally outward are formed. In each bracket engagement part 78, an engagement groove 78a elongated in the up-down direction is formed.

The headlight device 40 shown in FIG. 4 is mounted to the top bridge 4 and the bottom bridge 5 shown in FIG. 1 through an upper lamp bracket 80 and a lower lamp bracket 82, respectively.

Figure 5:
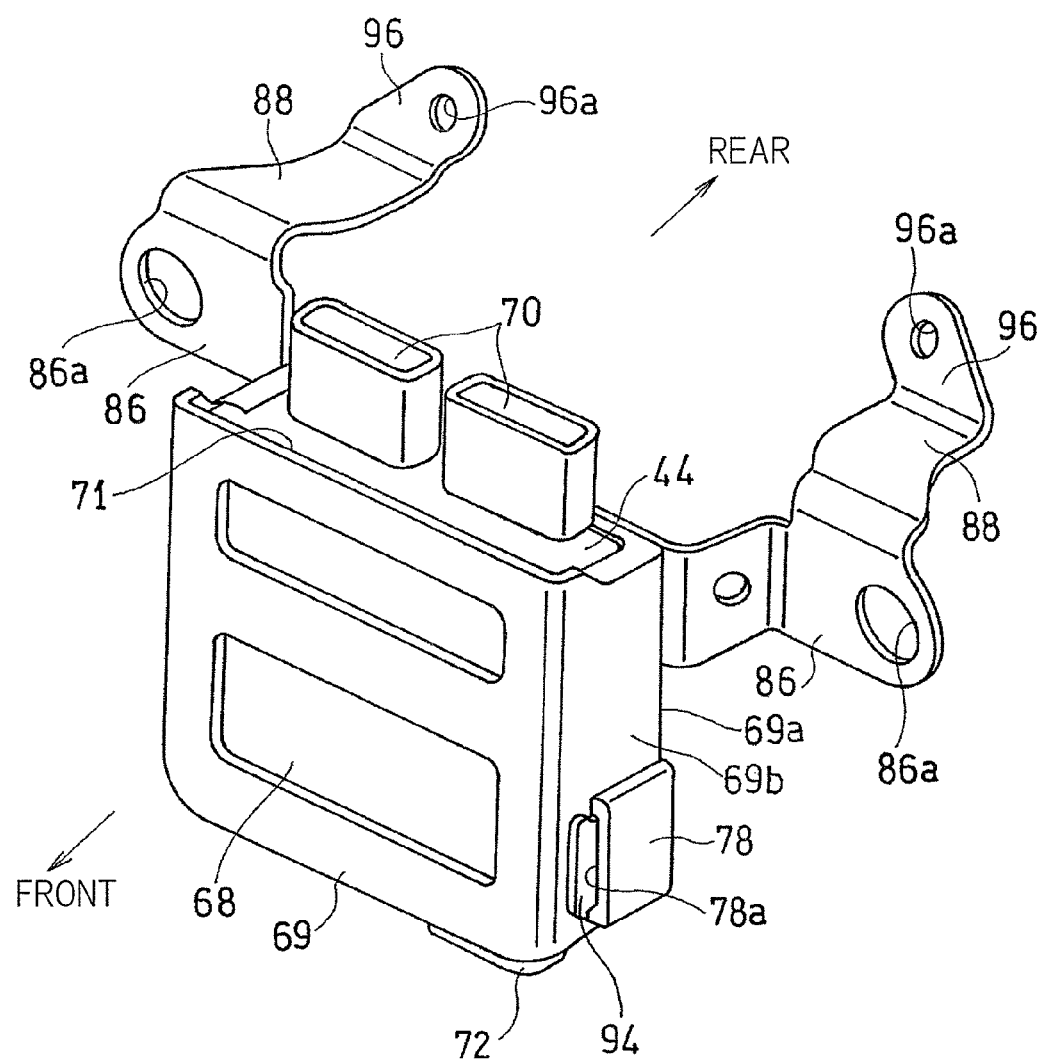
FIG. 5 is a perspective view showing a state in which a power supply circuit unit, a box, and a lamp bracket are assembled in the headlight device.
Figure 8:
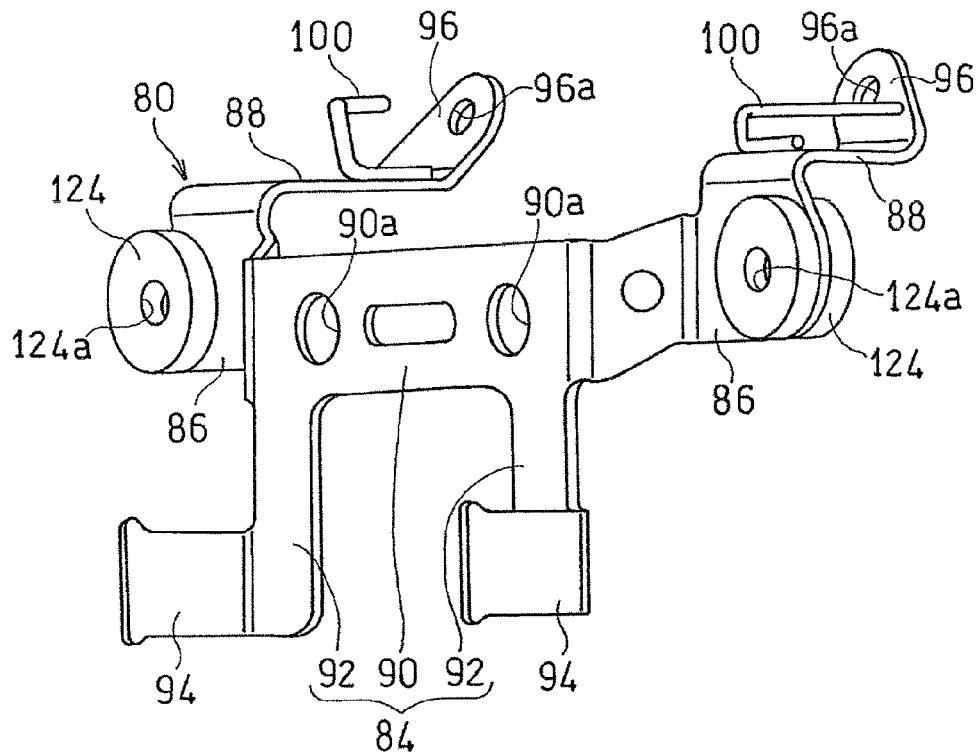
FIG. 8 is a perspective view showing the lamp bracket.

The upper lamp bracket 80 is formed by bending a sheet metal as shown in FIG. 8. The upper lamp bracket 80 includes a box engagement part 84 at a center portion in the motorcycle widthwise direction, upper lamp support parts 86, 86 extending in the motorcycle widthwise direction from left and right ends of the box engagement part 84, respectively, and bridge attachment parts 88 extending rearward from the respective upper lamp support parts 86, 86. As shown in FIG. 5, in each upper lamp support part 86, a lamp attachment hole 86a opened in the longitudinal direction is formed. In FIG. 5, a second holding member 100 described later is omitted.

The box engagement part 84 shown in FIG. 8 has a gate shape having a rectangular upper-half portion 90 elongated in the motorcycle widthwise direction, which constitutes an upper portion of the box engagement part 84, and a pair of lower-half portions 92, 92 extending downward from both ends of the upper-half portion 90. In the upper-half portion 90 of the box engagement part 84, two engagement holes 90a, 90a as through holes opened in the longitudinal direction are formed side by side in the motorcycle widthwise direction. At lower ends of the lower-half portions 92, 92 of the box engagement part 84, engagement pieces 94, 94 extending forward are formed, respectively.

The bridge attachment parts 88, 88 have, at rear ends thereof, inclined walls 96, 96 which are inclined obliquely rearward and upward. In the inclined walls 96, 96, bolt insertion holes 96a, 96a are formed. Each bridge attachment part 88 is provided with a second holding member 100 which holds cables 99 (FIG. 11) in cooperation with the later-described first holding member 98. The second holding member 100 is formed by bending a wire, and is fixed to the bridge attachment part 88 by means of welding.

As shown in FIG. 3, the upper lamp bracket 80 is mounted to the top bridge 4 through a mounting bracket 102. The mounting bracket 102 includes left and right support members 104, 104 and a connection member 106 that connects the left and right support members 104, 104. The connection member 106 is connected to each of the support members 104, 104 by means of welding. The support members 104, 104 are connected to the inclined walls 96, 96 of the left and right bridge attachment parts 88, 88 of the upper lamp bracket 80, respectively. The support members 104, 104 are, for example, metal plate members, and the connection member 106 is, for example, a metal rod member.

A welding nut 108 (FIG. 9) is fixed to a rear surface of each support member 104. In each support member 104, a bolt insertion hole 110 is formed inward of the welding nut 108 (FIG. 9) in the motorcycle widthwise direction. In FIG. 3, no bolt is inserted into the right-side bolt insertion hole 110, while a bolt 105 is inserted into the left-side bolt insertion hole. On the front surface of each support member 104, the above-described first holding member 98 is provided which allows the cables 99 (FIG. 11) to pass therethrough and holds the cables 99. The first holding member 98 is formed by bending a wire, and is fixed to the support member 104 by means of welding.

The right-side support member 104 is provided with a first cable support part 112 facing obliquely downward and outward, and a first through-hole 112a is formed in the first cable support part 112. The first cable support part 112 is formed by bending an upper end of the support member 104 frontward. The connection member 106 is provided with a second cable support part 114 extending obliquely upward and rearward. The second cable support part 114 is formed of a metal plate member, and is fixed to the connection member 106 by means of welding. A second through-hole 114a is formed in the second cable support part 114.

The upper lamp bracket 80 and the mounting bracket 102 cooperate together to form an opening in the up-down direction. The first and second holding members 98 and 100 and the first and second cable support parts 112 and 114 are arranged so as to guide the cables to the opening.

As shown in FIG. 4, the lower lamp bracket 82 includes lower lamp support parts 116, 116 respectively mounted to the lower bracket attachment pieces 66, 66 of the headlight device 40, and a motorcycle body mounting part 118 mounted to the bottom bridge 5 (FIG. 1). The lower lamp support parts 116, 116 are connected to the motorcycle body mounting part 118 by rod-shaped connection members 120, 120 extending in the longitudinal direction, which are clearly shown in FIG. 10. Connection between the respective members in FIG. 4 is performed by welding. The motorcycle body mounting part 118 is formed of a metal plate member extending in the motorcycle widthwise direction and facing in the up-down direction. Screw insertion holes 122, 122 are formed at both ends, in the motorcycle widthwise direction, of the motorcycle body mounting part 118. The lower lamp bracket 82 may be provided with a cable holding member such as the upper lamp bracket 80.

Assembly of the power supply circuit unit 44 to the lamp base 50 and mounting of the headlight device 40 to the motorcycle body will be described. The power supply circuit unit 44 shown in FIG. 5 is fitted into the upper opening 71 of the box 69 from above. Further, the left and right engagement pieces 94, 94 of the upper lamp bracket 80 shown in FIG. 8 are locked into the engagement grooves 78a, 78a of the left and right bracket engagement parts 78, 78 of the box 69, and the engagement projections 76, 76 of the box 69 shown in FIG. 7 are engaged with the engagement holes 90a, 90a of the upper lamp bracket 80 shown in FIG. 8. Thereby, the box 69 shown in FIG. 5 is engaged with the upper lamp bracket 80. Thus, the power supply circuit unit 44, the box 69, and the upper lamp bracket 80 are integrated.

Further, as shown in FIG. 8, anti-vibration elastic grommets 124 each having flanges at both ends thereof are fitted into the lamp attachment holes 86a of the upper lamp bracket 80. Subsequently, the integrated power supply circuit unit 44, box 69, and upper lamp bracket 80 are installed in the recess 56 at the upper portion of the lamp base 50 shown in FIG. 4. At this time, the box 69 is pressed against an inner surface of the recess 56. In this state, screws 126 are inserted from the rear into center holes 124a (FIG. 8) of the elastic members 124, and fastened to the screw bosses 55 of the lamp base 50 shown in FIG. 3. Thus, the lamp unit 42 and the power supply circuit unit 44 are supported by the upper lamp bracket 80.

Then, the mounting bracket 102 is mounted to the top bridge 4. Specifically, the bolt 105 is inserted from the front into the bolt insertion hole 110 of the mounting bracket 102, and fastened to a screw hole (not shown) formed in the top bridge 4.

Figure 10:
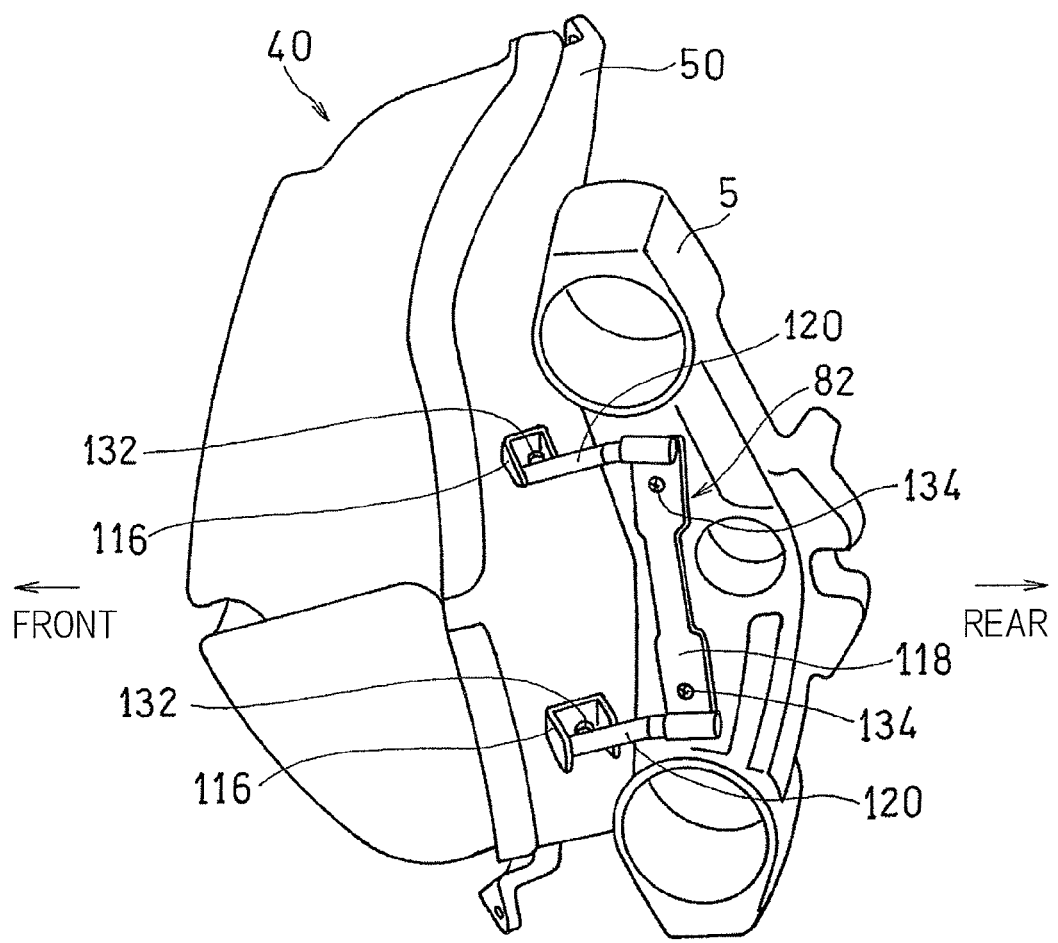
FIG. 10 is a bottom view showing a state in which a lower portion of the headlight device is mounted to the vehicle body.

Further, the lower lamp bracket 82 shown in FIG. 4 is mounted to the bottom bridge 5. Specifically, screw members 134 shown in FIG. 10 are inserted from below into the screw insertion holes 122 of the lower lamp bracket 82, and screwed into screw holes (not shown) formed in the bottom bridge 5.

Subsequently, the front fairing 30 is mounted to the headlight device 40. The bolts 53 shown in FIG. 4 are inserted from the rear into the insertion holes 54a formed in the fairing attachment pieces 54 of the lamp base 50 shown in FIG. 3, and fastened to screw holes (not shown) formed in the front fairing 30 shown in FIG. 2. Thereby, the front fairing 30 is mounted to the headlight device 40.

Figure 9:
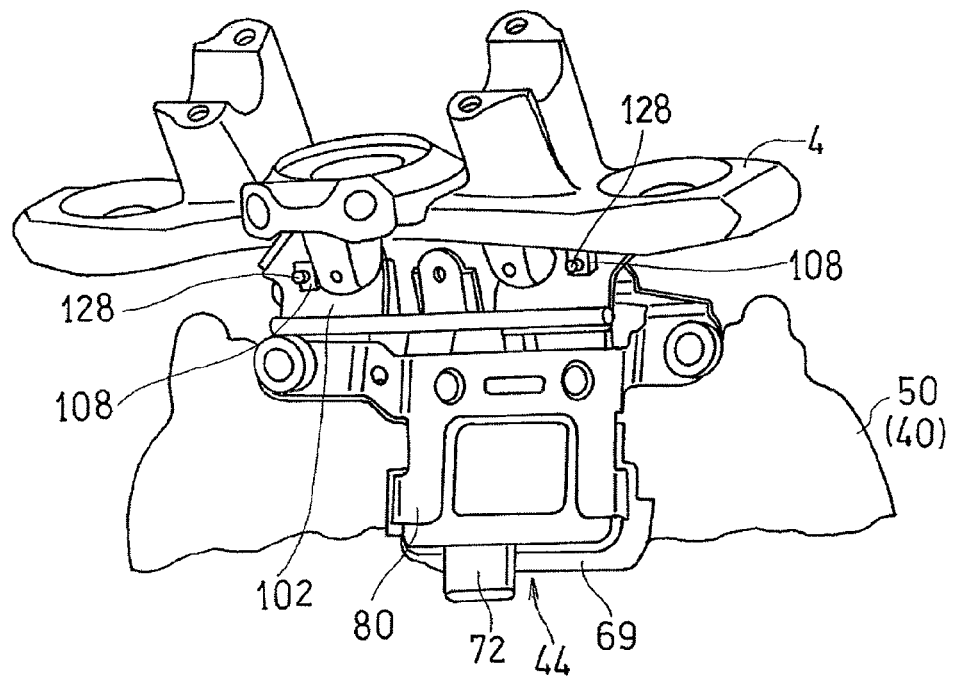
FIG. 9 is a perspective view showing a state in which an upper portion of the headlight device is mounted to a vehicle body, as seen obliquely from the rear and above.

Then, the headlight device 40 to which the front fairing 30 is fixed is mounted to the motorcycle body. First, mounting of the upper portion of the headlight device 40 to the top bridge 4 will be described. Specifically, bolts 128 shown in FIG. 3 are inserted from the front into the bolt insertion holes 96a of the upper lamp bracket 80 shown in FIG. 4, and is, after penetrating through the support members 104 of the mounting bracket 102, screwed into the welding nuts 108 (FIG. 9). Thereby, the upper lamp bracket 80 is mounted to the mounting bracket 102. Thus, the upper portion of the headlight device 40 is supported by the top bridge 4 through the upper lamp bracket 80 and the mounting bracket 102.

Subsequently, mounting of the lower portion of the headlight device 40 to the bottom bridge 5 will be described. Specifically, anti-vibration elastic grommets 130 each having flanges at both ends thereof are fitted into the lower bracket attachment holes 66a of the lower bracket attachment pieces 66 of the lamp base 50 shown in FIG. 4. Pins 132 fixed to the lower lamp support parts 116 of the lower lamp bracket 82 are fitted from below into center holes of the grommets 130. The pins 132 are fixed to the lower lamp support parts 116 by means of welding. Thereby, the lower portion of the headlight device 40 shown in FIG. 10 is supported by the bottom bridge 5 through the lower lamp bracket 82.

Figure 11:
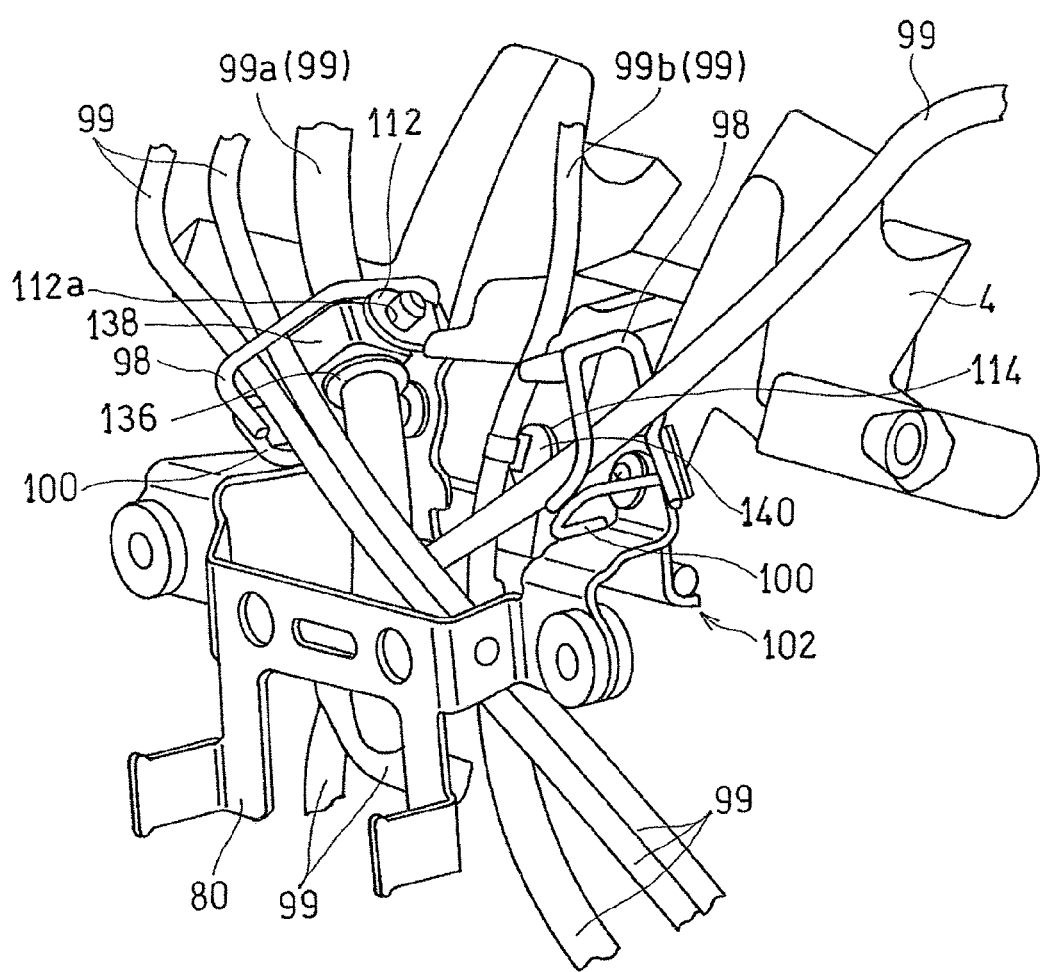
FIG. 11 is a perspective view showing a state in which cables are held by a cable holding member provided in the lamp bracket, as seen obliquely from the front and left side.

A cable holding structure will be described. As shown in FIG. 11, the cables 99 from the handlebar 10, a meter unit 6 and the like supported by the top bridge 4 are guided by the first holding members 98 provided in the mounting bracket 102 and the second holding members 100 provided in the upper lamp bracket 80, to the opening in the up-down direction which is formed by the mounting bracket 102 and the upper lamp bracket 80. For example, the cables 99 include an accelerator grip cable, a grip switch cable, a brake hose, a meter harness, a clutch hose, and the like.

Part of the cables 99, for example, a brake hose 99a is supported by the first cable support part 112 of the mounting bracket 102. Specifically, the brake hose 99a is inserted in an elastic grommet 136, and the elastic member 136 is held by a clamp member 138 attached to the first through hole 112a of the first cable support part 112. Thus, the brake hose 99a is supported by the mounting bracket 102.

Further, part of the cables 99, for example, a meter harness 99b is supported by the second cable support part 114 of the mounting bracket 102. Specifically, the meter harness 99b is held by a binding member 140 attached to the second through-hole 114a (FIG. 3) of the second cable support part 114. Thereby, the meter harness 99b is supported by the mounting bracket 102.

Thus, an assembly of the headlight device 40, the front fairing 30, the upper and lower lamp brackets 80 and 82, the mounting bracket 102 and the cables 99 is formed. This assembly is mounted to the top bridge 4 and the bottom bridge 5 shown in FIG. 1, whereby the headlight device 40 and the front fairing 30 are supported by the motorcycle body. The cables 99 are connected to the respective devices via connectors.

In the above-described preferred embodiment, since LEDs are used as the light sources 46a and 48a of the lamp units 42 shown in FIG. 2, the lamp units 42 can be downsized. Since the downsized lamp units 42 are located at the lowermost position in the front fairing 30, the lamp units 42 can be easily accommodated in the front fairing 30 even when the front fairing 30 is downsized. Since the front fairing 30 has a tapered shape having an upper portion of a small length in the longitudinal direction, and a lower portion of a large length in the longitudinal direction, it is preferable for the downsized front fairing 30 that the lamp units 42 are located at the lower position in the front fairing 30 where a sufficient space is secured.

At this time, since the power supply circuit unit 44 is accommodated in the recess 56 provided above the lamp units 42 shown in FIG. 4, the lamp units 42 can be located at the lower position in the front fairing 30 without being obstructed by the power supply circuit unit 44. Thus, the lamp units 42 and the power supply circuit unit 44 can be accommodated in the front fairing 30 in a compact manner while downsizing the front fairing 30.

Since the box 69 formed of an elastic body is interposed between the power supply circuit unit 44 and the recess 56, positional deviations between the power supply circuit unit 44 and the lamp units 42 in the longitudinal direction and the motorcycle widthwise direction are absorbed by the elastic body.

Further, since the power supply circuit unit 44 is incorporated in the lamp units 42 by only accommodating the box 69 in the recess 56, the assembly is facilitated. Further, since the box 69 is pressed against the inner surface of the recess 56, the relative position of the box 69 to the lamp units 42 is made stable. Thereby, the box 69 and the upper lamp bracket 80 can be connected not by fastening but by a simple insertion-type locking structure. Further, since the box 69 is formed of an elastic body, vibration transmitted from the upper lamp bracket 80 during traveling of the motorcycle is also absorbed.

Moreover, since the upper lamp bracket 80 supports both the lamp units 42 and the power supply circuit unit 44, the number of components and the number of assembling steps are reduced. Further, the assembly is configured by connecting the upper lamp bracket 80 and the mounting bracket 102 to the headlight device 40 and the front fairing 30, and the assembly is mounted to the top bridge 4, whereby the headlight device 40 and the front fairing 30 are assembled to the motorcycle body. Therefore, assemblability of the headlight device 40 and the front fairing 30 is improved.

Since the mounting bracket 102 and the upper lamp bracket 80 shown in FIG. 11 are provided with the first and second holding members 98 and 100, respectively, the mounting bracket 102 and the upper lamp bracket 80 can also be used for holding the cables 99. When the above-described assembly is configured, the cables 99 may be held by the first and second holding members 98 and 100, whereby the assemblability is further improved.

The present invention is not limited to the embodiments described above, and various additions, modifications, or deletions may be made without departing from the gist of the invention. Accordingly, such additions, changes, or deletions are to be construed as included in the scope of the present invention.

REFERENCE NUMERALS

4 . . . top bridge
8 . . . front fork
30 . . . front fairing
40 . . . headlight device
42 . . . lamp unit
44 . . . power supply circuit unit
46a, 48a . . . light source (LED)
56 . . . recess
69 . . . box (elastic body)
80 . . . upper lamp bracket (lamp bracket)
98 . . . first holding member
100 . . . second holding member
102 . . . mounting bracket

What is claimed is:

1. A headlight device for a motorcycle, accommodated in a front fairing of the motorcycle, the headlight device comprising:
two lamp units, each lamp unit using an LED as a light source, the two lamp units being disposed in juxtaposition in a vehicle widthwise direction, the two lamp units having a recess in therebetween, the recess being recessed downward;
a power supply circuit unit configured to control power from a power supply and then supply the power to the light source, wherein
the power supply circuit is accommodated in the recess,
an elastic body is interposed between the power supply circuit unit and the recess, the recess is provided in the upper portion of the lamp unit, the power supply circuit is accommodated in a box formed by the elastic body and opened upward, and the box is pressed against an inner surface of the recess, wherein
the power supply circuit unit and the two lamp units are supported by a lamp bracket,
the lamp bracket includes:
a box engagement part at a center portion in the vehicle widthwise direction, the box engagement part supporting the box;
lamp support parts extending in the vehicle widthwise direction from opposite ends of the box engagement part, and the lamp support parts supporting the lamp units;
bridge attachment parts extend rearward from the respective upper lamp support parts, the bridge attachment parts being mounted to a top bridge which supports a front fork;
an engagement piece extending forward from the lower portion of the box engagement part; and
an engagement hole defined in the upper portion of the box engagement part, the engagement hole being opened in a forward and rearward direction of the motorcycle, wherein
the box includes;
engagement projections engaging with the engagement hole; and
an engagement groove defined therein with which the engagement piece is engaged.

2. The headlight device for the motorcycle as claimed in claim 1, wherein the bridge attachment parts of the lamp bracket is mounted to the top bridge through a mounting bracket.

3. The headlight device for the motorcycle as claimed in claim 2, wherein the bridge attachment parts of the mounting bracket are provided with a first holding member which allows cables to pass therethrough and holds the cables.

4. The headlight device for the motorcycle as claimed in claim 3, wherein the lamp bracket is provided with a second holding member which holds the cables in cooperation with the first holding member.

5. The headlight device for the motorcycle as claimed in claim 1, further comprising:
the front fairing is made of a resin and is supported by the headlight device to extend on a front of the motorcycle and above a front wheel, wherein the front fairing covers the headlight devices from a top, bottom and both sides and the power supply circuit unit is positioned in the recess adjacent lens covers for each of the two lamp units.

6. A headlight device for a motorcycle, accommodated in a front fairing of the motorcycle, the headlight device comprising:
a lamp unit using an LED as a light source; and
a power supply circuit unit configured to control power from a power supply and then supply the power to the light source, wherein:
the power supply circuit unit is accommodated in a recess provided in an upper portion of the lamp unit;
the lamp unit is supported by a lamp bracket;

the power supply circuit unit is accommodated in a box formed by an elastic body and having an opening facing upward;

the lamp bracket includes:

a box engagement part at a center portion in the vehicle widthwise direction, the box engagement part supporting the box;

lamp support parts extending in the vehicle widthwise direction from opposite ends of the box engagement part, the lamp support parts supporting the lamp units;

bridge attachment parts extending rearward from the respective upper lamp support parts, the bridge attachment parts being mounted to a top bridge which supports a front fork;

an engagement piece extending forward from the lower portion of the box engagement part; and an engagement hole defined in the upper portion of the box engagement part, the engagement hole being opened in a forward and rearward direction of the motorcycle, and the box includes an engagement projection which is engaged with the engagement hole and an engagement groove defined therein, with which the engagement piece is engaged.

7. The headlight device for a motorcycle, accommodated in the front fairing of the motorcycle as claimed in claim 6, further comprising:

the front fairing is made of a resin and is supported by the headlight device to extend on a front of the motorcycle and above a front wheel, wherein the front fairing covers the headlight devices from a top, bottom and both sides and the power supply circuit unit is positioned in a recess adjacent a lens cover respectively on each of two lamp units that are juxtaposition in the front fairing in the motorcycle widthwise direction with the recess extending vertically between each of the two lamp units.

* * * * *